Dec. 23, 1952  J. F. BAYHI ET AL  2,623,113
SEISMIC PROSPECTING WITH OPTIMUM GEOPHONE COVERAGE
Filed Nov. 1, 1951  2 SHEETS—SHEET 1

Joseph F. Bayhi
John T. Baker  Inventors

By W. O. T Heilman  Attorney

Patented Dec. 23, 1952

2,623,113

UNITED STATES PATENT OFFICE 2,623,113

SEISMIC PROSPECTING WITH OPTIMUM GEOPHONE COVERAGE

Joseph F. Bayhi and John T. Baker, Tulsa, Okla., assignors to Standard Oil Development Company, a corporation of Delaware Application November 1, 1951, Serial No. 254,254

3 Claims. (Cl. 177—352)

This invention concerns improvements in the art of seismic prospecting and is directed particularly to an electronic circuit and geophone arrangement wherein the effect of using an overlapping pattern of geophones in the seismic spread is obtained without actual use of such overlapping.

A method commonly employed in searching for areas likely to contain oil or other mineral deposits is that known as seismic prospecting wherein a seismic disturbance is initiated at a selected point in or on the earth's surface as, for example, by detonating an explosive charge in a shot hole, which causes seismic waves to travel through the earth and to be reflected from various substrata, the upward traveling reflected waves being detected at a number of points spread out in a desired pattern from the point of the initial seismic disturbance. Sensitive pickups called seismic detectors, seismometers or geophones, are arranged at the detection points to translate the detected motion into electrical impulses which after suitable amplification are recorded on a seismograph. The records may be in the form of waves or traces representative of the seismic waves that have been picked up by the individual geophones or they may be in the form of variable density or variable area records and in each case will be plotted as a function of time along the record, suitable timing marks being simultaneously made on the record so that when the same is later examined it will be possible to determine the length of time required for the arrival of the detected waves at any particular one of the detection points. From other data obtained in the area being studied, for example, seismic wave velocities in various earth layers, it is then possible to estimate the depth of the various substrata.

Although it is theoretically possible to time the arrival of a reflected seismic wave by the use of a single geophone and recording device, in practice it is usually difficult and sometimes impossible to pick out indicated reflected waves from a number of other earth vibrations that are detected and recorded at the same time. Therefore the usual practice is to employ a plurality of seismometers spread over a considerable distance along the earth's surface in a selected pattern as just described and to make a plurality of traces in side-by-side relation on a single chart for purposes of comparison, since a reflection from a well defined stratum will appear on the record as a wave form of increased amplitude on all of the traces in some definite time relation, thus permitting the reflection to be "lined up" on the record.

It has been found that when difficulty is encountered in obtaining suitable reflections on the record in some prospecting areas significant improvements in the ratio of usable to spurious signals or, in other words, in the ratio of reflection to non-reflection energy can often be obtained by using a plurality of geophones at each detection station all tied to one trace on the record. Some improvement is also obtained by using greater surface coverage for the geophones connected to each trace. However, it is desirable to avoid excessive time step-out between the arrival of related events on adjacent traces when the individual trace coverage is made greater; hence the separation between detection stations should remain essentially the same. In order to do this it is frequently necessary to have the geophones tied to one trace overlap those of adjacent traces.

It is an object of the present invention to furnish a circuit arrangement whereby the desirable effect of multiple geophone patterns is obtained without requiring that any overlapping of geophones occur. This is accomplished by providing an electronic circuit to take the place of the overlapping geophones, which reduces the time required to lay out the geophones at each detection station.

The nature and objects of the invention and the manner in which it is utilized will be more clearly appreciated from the ensuing description, particularly when taken in conjunction with the accompanying drawing in which.

Figure 1:
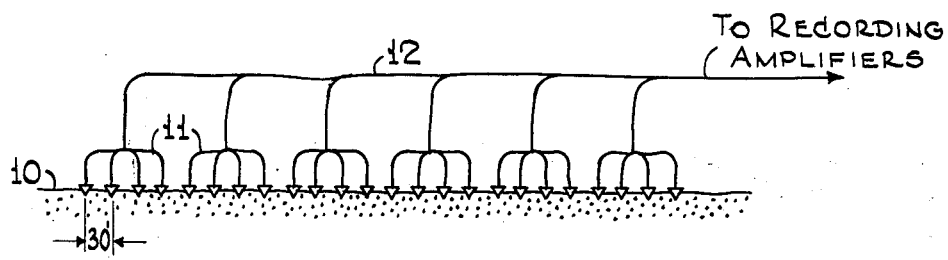
Figure 1 is a schematic diagram of a conventional multiple geophone spread for six recording channels.

In Figure 1 a conventional multiple geophone spread for six recording channels is shown, the geophones 11 being placed upon or embedded in the surface of the ground 10 and evenly spaced with a separation, for example, of 30 feet. Suitable connection is made between each group of geophones and recording amplifiers through a cable 12.

Figure 2:
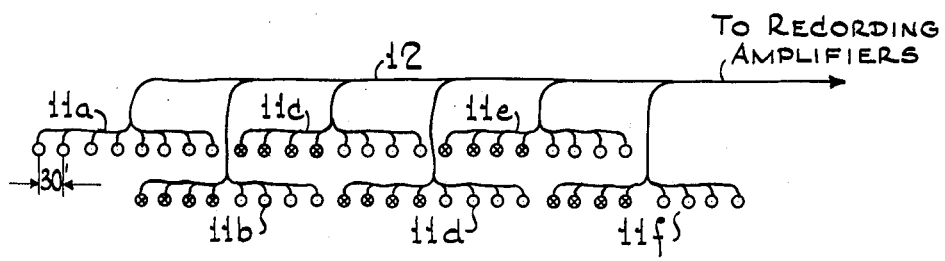
Figure 2 is a schematic diagram showing a more desirable geophone spread in which there is overlapping between traces.

In Figure 2 there is shown in plan view a more desirable geophone spread covering a distance of 810 feet as compared to 690 feet with the spread shown in Figure 1 while preserving the same separation of 30 ft. between adjacent geophones. It will be noted that in order to accomplish this, overlapping between adjacent groups of geophones is necessary. Thus the last four of the geophones in group 11a overlap the first four geophones in group 11b, and so on. The overlapping geophones in each group are marked with crosses. If these four overlapping geophones in each group are placed side by side with those of the adjacent group with which they overlap the signals from the two sets of geophones will be almost identical. In the present invention the benefits of such an overlapping can be obtained by omitting the overlapping geophones, i. e. those marked with crosses, and replacing them with an electronic isolating and overlapping circuit as shown schematically in Fig. 3. Here seven groups of geophones with four units in each group are employed and the same spacing of 30 ft. between adjacent geophones is used. The signals from the geophones are fed through cable 12 to an isolating and overlapping circuit 15 and from thence to the usual recording amplifiers, six traces being made from the seven groups of geophones. Thus the same coverage of 810 ft. is made with 28 geophones rather than with the 48 geophones of Figure 2, which reduces the geophone setup time by a factor of 1.7.

Figure 3:
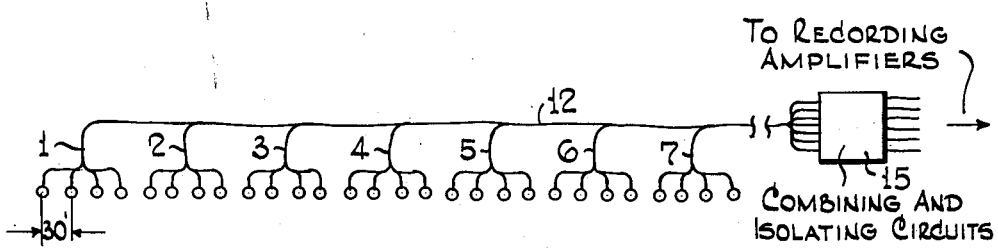
Figure 3 is a schematic representation of a geophone spread employed in conjunction with the present invention wherein the overlapping geophones have been removed and replaced by a special electronic circuit.
Figure 4:
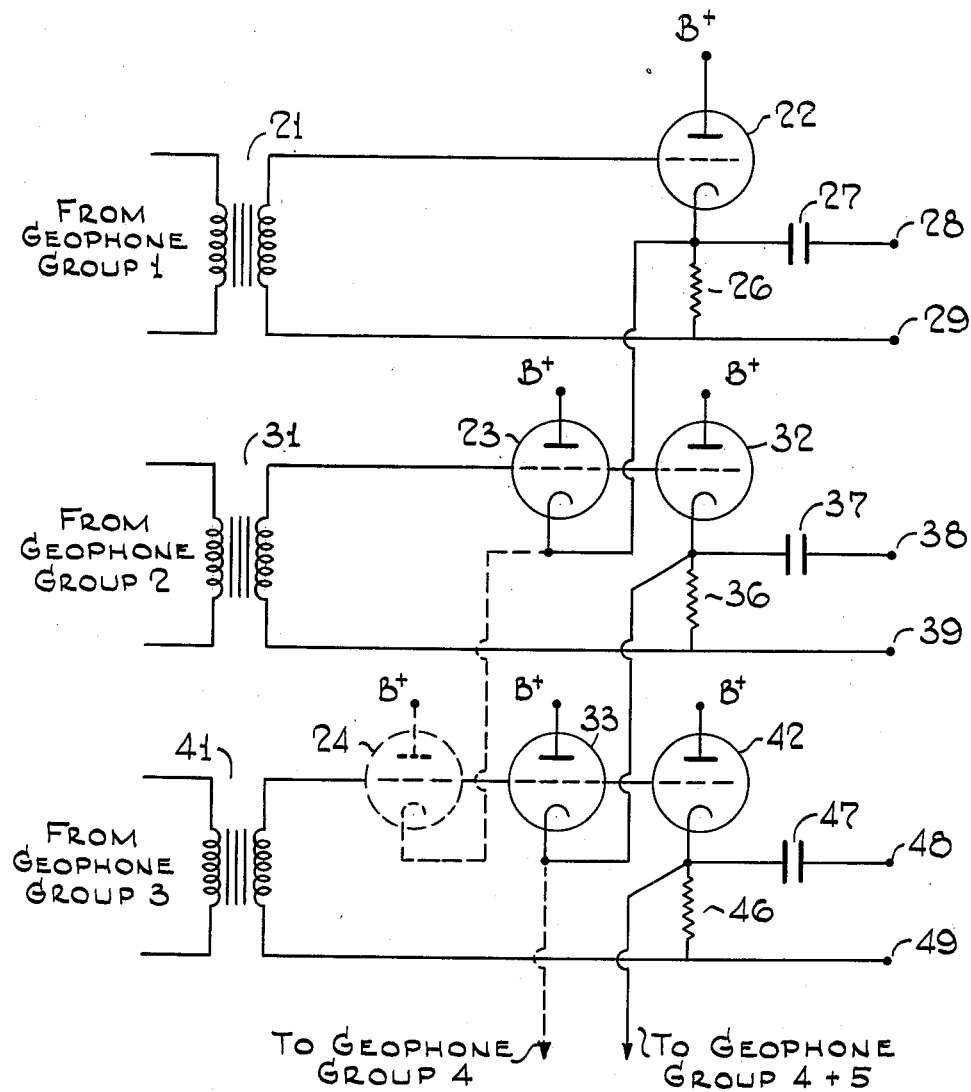
Figure 4 is a circuit diagram of an electronic circuit suitable for practicing this invention.

In Fig. 4 is presented a diagram of a suitable electronic circuit constituting the isolating and overlapping arrangement 15 of Fig. 3. This circuit consists of a number of primary and auxiliary cathode follower stages, each primary cathode follower stage having its cathode circuit common to that of the corresponding auxiliary cathode follower stage. The output signal from a first group of geophones is fed to the first primary cathode stage, the output signal of a second group of geophones is fed to the second primary cathode stage and to the first auxiliary cathode stage, and so on, the output signal of the final group of geophones being fed to the final auxiliary stage only. The outputs from each primary cathode stage are fed to a channel of a recording seismograph. Since the number of primary stages is one less than the number of geophone groups the number of traces will be one less than the number of geophone groups. Thus, as mentioned above, with seven geophone groups there will be six recorded traces.

Referring now in detail to Fig. 4 it will be seen that the output of geophone group 1 is fed through input transformer 21 to a cathode follower stage comprising vacuum tube 22, cathode resistor 26 and isolating capacitor 27 to output terminals 28 and 29, which may be connected to one channel of a seismograph recording amplifier. Likewise, signals from geophone group 2 are fed through transformer 31 to a cathode follower stage comprising vacuum tube 32, cathode resistor 36 and isolating capacitor 37 to output terminals 38 and 39, which may be connected to another channel of a recording amplifier. At the same time the signal from geophone group 2 is fed to terminals 28 and 29 through a cathode follower stage whose cathode circuit is common to that of the stage receiving signals from geophone group 1, this cathode follower stage comprising vacuum tube 23 and cathode resistor 26. Thus the signal appearing at terminals 28 and 29 is made up of components from the signals of geophone groups 1 and 2. In the same manner the total signal appearing at terminals 38 and 39 is made up of components from the outputs of geophone groups 2 and 3 and the total signal at terminals 48 and 49 is made up of components from geophone groups 3 and 4. Using the same terminology as above, the cathode follower stage comprising vacuum tube 22 may be designated the first primary stage and the stage comprising tube 23 may be designated the first auxiliary stage. Signals from the final group of geophones will be fed to a final auxiliary stage but not directly to a final primary stage. A simple case can be illustrated by Fig. 4. If there are only three groups of geophones, the signals from geophone group 3 will be fed to vacuum tube 33 but vacuum tube 42 will not be used. Thus the signals from the three geophone groups will be recorded on only two traces, these being connected into terminals 28 and 29 and 38 and 39. In other words the number of traces will be one less than the number of geophone groups, as already stated.

The isolating and overlapping electronic circuit of this invention utilizes cathode coupled stages to combine the outputs of two or more adjacent geophone groups and feed the combined outputs into a single recording channel. It should be noted, however, that each geophone group is electrically isolated from adjacent groups by the vacuum tubes so that, for example, a signal from geophone group 1 is not "mixed" with that from geophone group 2 by means of resistor or transformer networks. Furthermore the signal from geophone group 1 that contributes to the character and magnitude of the total signal appearing at terminals 28 and 29 plays no part whatever in forming the signal appearing at terminals 38 and 39. Likewise the signal from geophone group 2 contributes to the character and magnitude of the total signal appearing at the output terminals 28 and 29, and 38 and 39 but plays no part in forming the signal at terminals 48 and 49. It is evident that the recorded trace of the recording channel fed by terminals 28 and 29 will have in common with the recorded trace of channel fed by terminals 38 and 39 only that signal which is the output of geophone group 2. Hence only a portion of the character and magnitude of the resultant signal on each channel is common to that of adjacent channels. Thus the circuit of the present invention is quite different from the conventional geophone mixing circuits sometimes referred to as "CMI" circuits wherein a certain percentage of the entire signal from each recording channel is combined with the signal from an adjacent channel to form the signal for a certain seismograph trace. Therefore a fundamental disadvantage associated with conventional seismograph mixing or compositing wherein "forcing" of reflections occurs is avoided in the circuit of this invention.

With the arrangement just described it will be noted that a 50% overlap between adjacent traces is obtained. A 66⅔% overlap can be obtained by use of additional vacuum tubes in the circuit as indicated by the portion of the circuit shown in phantom in Figure 4. Thus the signal from geophone group 3 will be fed through vacuum tube 24 to combine with the signals appearing across terminals 28 and 29. Th total signal on the recording channel connected to terminals 28 and 29 will now be the resultant of the character and magnitudes of the signals from geophone groups 1, 2 and 3. In the same manner a third vacuum tube in each of the succeeding stations associated with geophone group 4, 5, etc. may be used to feed signals to terminals 38 and 39, 48 and 49, and so on. Conveniently the circuit could be so arranged that either 50% or 66⅔% overlap could be obtained merely by cutting vacuum tube 24 and related vacuum tubes in or out of the circuit, e. g. by supplying or not supplying heater current to these vacuum tubes.

It will be apparent to persons skilled in the art that many modifications of this invention are possible without departing from its scope. It is therefore intended that the invention not be limited to the specific examples presented. The scope of the invention is defined by the following claims.

What is claimed is:

1. Apparatus for recording detected seismic waves at a plurality of spaced detection points adjacent the earth's surface comprising at least one seismic detector at each of said detection points, an electronic circuit adapted to combine characteristics of the signals received at each detection point with signals received at adjacent detection points, said electronic circuit comprising a plurality of primary cathode follower stages, one less in number than the number of said detection points, a plurality of auxiliary cathode follower stages equal in number to said primary cathode follower stages, the first of said primary stages having a cathode circuit common to that of the first of said auxiliary stages and each succeeding primary stage having a cathode circuit common to that of each succeeding auxiliary stage, means connecting the outputs of the detectors at a first detection station to the input of the first primary cathode follower stage, means connecting the outputs of the detectors at the final detection station to the input of the final auxiliary stage, and additional means connecting the outputs of the detectors at each intermediate station to the inputs of succeeding intermediate primary stages and to the inputs of the corresponding immediately preceding auxiliary stages.

2. Apparatus for recording detected seismic waves at a plurality of spaced detection points adjacent the earth's surface comprising a plurality of seismic detectors arranged in spaced relation at each of said detection points, an electronic circuit adapted to combine characteristics of the signals received at each detection point with signals received at adjacent detection points, said electronic circuit comprising a first primary cathode follower stage, means connecting the outputs of the detectors at a first detection station with the input of said first primary cathode follower stage, a first auxiliary cathode follower stage having a cathode circuit common to that of said first primary cathode follower stage, a second primary cathode follower stage, means connecting the outputs of the seismic detectors at a second detection station with the inputs of said second primary cathode follower stage and of said first auxiliary cathode follower stage, a second auxiliary cathode follower stage having a cathode circuit common to that of said second primary cathode follower stage, an additional primary cathode follower stage and an additional auxiliary cathode follower stage with a common cathode circuit for each additional detection station less one, means connecting the detectors at each of said additional detection stations, less one, with the inputs to the corresponding primary and intermediately preceding auxiliary cathode follower stages in the manner aforesaid, and means connecting the detectors at the final detection station with the input to the final auxiliary cathode follower stage.

3. Apparatus according to claim 2 including a third set of cathode follower stages, the same being less in number by two than the number of detection stations, the number of detection stations being at least three, the first of said third set of cathode follower stages having a cathode circuit common to that of said first primary cathode follower stage and said first auxiliary cathode follower stage, the means connecting the inputs of the seismic detectors at a third detection station with the input of the second auxiliary stage also connecting the same with the input of the first of said third set of cathode follower stages, the additional connecting the outputs of the seismic detectors at additional detector stations with the respective additional auxiliary stages likewise connecting said outputs seriatim with the inputs of the respective remaining members of said third set of cathode follower stages.

JOSEPH F. BAYHI.
JOHN T. BAKER.

REFERENCES CITED

The following references are of record in the file of this patent:

UNITED STATES PATENTS

| Number | Name | Date |
| --- | --- | --- |
| 2,473,469 | Dahm | June 14, 1949 |
| 2,509,651 | Olson | May 30, 1950 |